Figure 1:
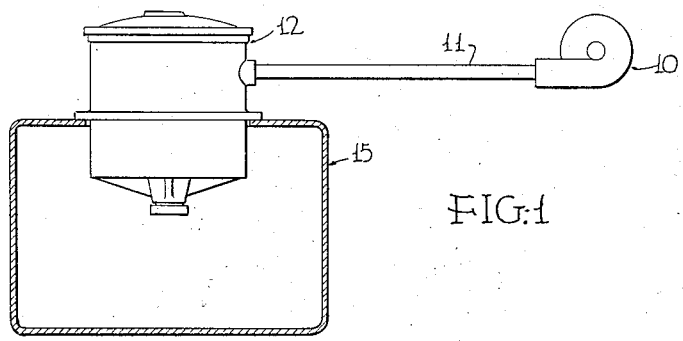

June 8, 1943.  L. D. JONES  2,321,144
CENTRIFUGAL PURIFICATION OF LIQUIDS
Filed Feb. 19, 1940

INVENTOR.
Leo D. Jones
BY Maurice A. Crews
ATTORNEY.

Patented June 8, 1943

2,321,144

UNITED STATES PATENT OFFICE 2,321,144

CENTRIFUGAL PURIFICATION OF LIQUIDS

Leo D. Jones, Philadelphia, Pa., assignor to The Sharples Corporation, Philadelphia, Pa., a corporation of Delaware Application February 19, 1940, Serial No. 319,587

14 Claims. (Cl. 233—24)

The present invention pertains to the art of centrifugal purification of liquids and to centrifugal separators and other apparatus designed for this use, the term "centrifugal separator" being used in a broad sense to include centrifugal machines of either the "separator" or "clarifier" type. The invention was conceived in connection with research on the problem of continuously purifying used oil as removed from crank cases of aviation motors, during use of such motors. It will therefore be described with specific reference to that problem, with the understanding that it may be applied to other problems, such as the purification of other types of lubricating oil, or in even broader fields.

One of the primary considerations in the design of any equipment to be used on an aeroplane is, of course, lightness in weight. In order to achieve lightness, the centrifugal separator and associated parts of the present invention are driven and fed by elements which would be required in the aeroplane equipment even if no centrifugal separator were used to purify the oil. Thus, the centrifugal rotor is driven directly by turbine action by the oil on which it operates, and the energy for this driving power is derived from the conventional scavenging pump by which the oil is removed from the crank case and passed to the oil tank in conventional aeroplane design. The centrifugal separator is mounted directly above the oil tank, and the conduit by which the oil is fed to the centrifugal separator is thus the only conduit necessary to pass the oil from the crank case to the oil tank.

In order to purify the oil continuously to a degree which keeps it suitable for aviation work, it is necessary that a high centrifugal force be applied to the oil for a period of time sufficient to remove all of the larger abrasive particles. The development of a process and apparatus capable of effecting the desired purification without exceeding the size and weight limitations of aeroplane design has not, insofar as known to me, been achieved prior to development of the present invention.

The principle objects of the invention have been to provide an apparatus and process capable of solving the problems discussed above.

A further object of the invention has been to provide an apparatus and process by which the oil may be adequately purified at the same rate at which it is removed from the crank case by the scavenging pump, and to effect the desired degree of purification regardless of the sudden variations in the rate of oil flow from the crank case caused by fluctuations in the motor speed.

A further object of the invention has been to provide an arrangement by which lubrication of the centrifugal bearings is effected by an oil mist formed by discharge of oil from the centrifugal rotor against a surrounding casing.

A further object of the invention has been to provide a centrifugal rotor having parts which may be quickly and conveniently taken apart for cleaning.

A further object of the invention has been to provide a bearing arrangement and a turbine arrangement for the centrifugal rotor by which the pressure energy imparted to the oil by the scavenging pump is converted with maximum efficiency into kinetic energy of rotation of the centrifugal rotor and contents.

Figure 2:
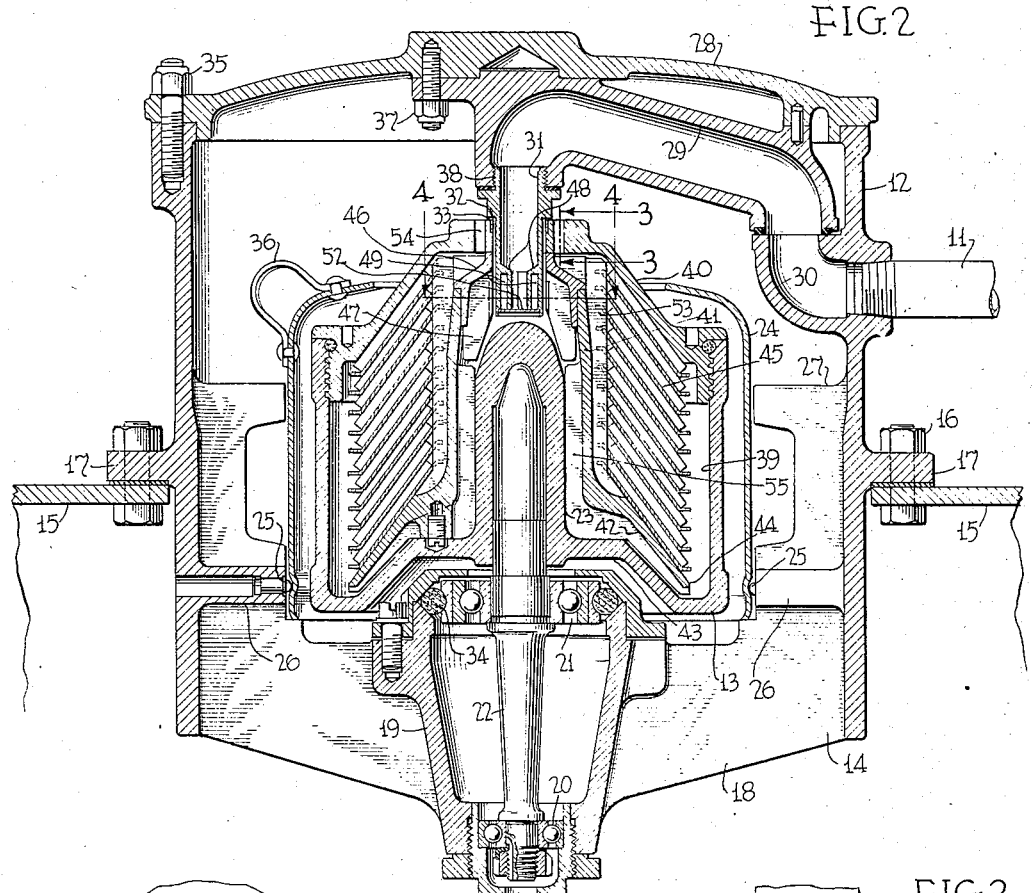
Figure 4:
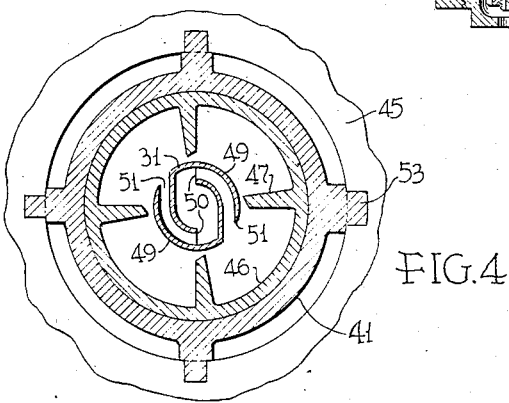
Figure 3:
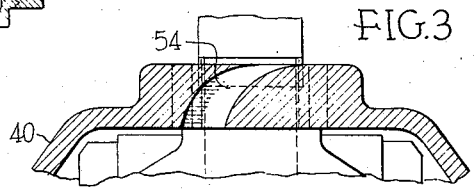

Still further objects and advantages of the invention, and the manner in which these objects and advantages have been attained, will be evident to the person skilled in the art from a reading of the following specification in the light of the attached drawing, in which, Figure 1 is a general diagrammatic view of the arrangement of equipment of the invention, Figure 2 is a central longitudinal cross section through the centrifugal separator of the invention, Figure 3 is a cross section taken on the line 3/3 of Figure 2, and Figure 4 is a horizontal cross section taken on the line 4/4 of Figure 2.

In the preferred embodiment of the invention, as applied to an aeroplane lubricating system, oil is pumped to the purifying apparatus by a pump 10. This pump may be a scavenging pump used to discharge oil from the crank case of the aeroplane. Oil from pump 10 is passed through conduit 11 into the casing 12 of the centrifugal separator of the invention. The oil passes to and through the rotor 13 of the centrifugal separator, and drives this rotor by turbo action. It is then discharged from the rotor and directed through an opening 14 in the base of the casing 12, into an oil reservoir or tank 15. The oil reservoir 15 may be the conventional oil tank of the aeroplane, from which oil is taken for lubrication of the motor or other parts of the machine, as required.

The arrangement described above, by which oil is fed by the scavenging pump to the centrifugal rotor, and is dropped directly from the centrifugal rotor into the oil reservoir, mounted beneath the rotor, has important advantages from the standpoint of simplicity of design and economy of equipment and weight. By using the scavenging pump of the aeroplane as the source of power for driving the centrifugal rotor, a saving is made both in expense of equipment required, and in weight. By mounting the centrifugal separator directly over the oil tank, the conduit by which the oil is passed from the scavenging pump to the centrifugal rotor also serves a dual function. But this arrangement of apparatus introduces important problems of centrifugal and turbine design, since the power which may be derived from the scavenging pump is quite limited. When we consider that the size and weight requirements of the centrifugal separator parts themselves are also quite limited because of considerations of weight and economy, the problem of providing a machine designed in accordance with the principles discussed above, which is at the same time capable of performing a fine degree of purification of the oil, is a very difficult one. Insofar as we know, the present invention represents the first successful solution of this problem.

The details of the centrifugal separator of the invention are illustrated in Figures 2 to 4 of the drawing. Referring to these figures of the drawing by reference characters, the centrifugal casing 12 may be detachably secured to the top of the oil tank 15 by any suitable means, such as a nut and bolt connection 16 passing through a flange 17 of the casing 12, and through a part of the oil tank.

A plurality of wings 18 project inwardly from the bottom part of the casing 12, and these wings support a tubular bearing housing 19. Longitudinally spaced ball bearings 20 and 21 are secured within this bearing housing, and support the lower end of the shaft 22 of the centrifugal rotor for rotation within the housing. The upper bearing 21 may be flexibly supported by means of an elastic ring 34, as will be well understood by those familiar with the centrifugal art. The centrifugal rotor 13 is secured to the upper end of the shaft 22 for rotation therewith, by sliding the bearing sleeve 23 at the base of the centrifugal rotor over the upper end of the shaft 22.

An annular guard 24 is preferably provided, and this guard surrounds the outer wall of the centrifugal rotor, to prevent liquid discharged from the rotor from contacting the outer wall of the rotor and acting to retard the rotation thereof. This guard may be detachably secured in place by means of spring-pressed detents 25 secured in arms 26 which extend radially inward from the rotor casing. Wings 27 which project inwardly from the inner wall of the casing 12 also assist in holding the guard 24 in proper position relative to the rotor 13.

A cover plate 28 is secured to the upper end of the casing 12, and a conduit 29 for directing oil fed into the casing to the centrifugal rotor may be detachably secured to this cover plate. In the construction shown in the drawing, the conduit 29 communicates with a conduit 30 formed in the wall of the casing 12. The conduit 29 and cover 28 are detachably mounted both with respect to the main body of the casing 12, and with respect to the conduit 30 and feed nozzle 31 by which liquid is fed from conduit 29 to the centrifugal rotor 13. The detachable securement of the nozzle 31 to the conduit 29 preferably involves screw threaded engagement of these parts, and this screw threaded engagement is preferably of such character as to tend to screw the end of the nozzle 31 up into the base of the conduit 29 upon engagement of the centrifugal rotor with any part of the nozzle 31 during normal operation of the machine. By reason of this arrangement, accidental loosening of the threaded connection between the nozzle 31 and conduit 29 is avoided during operation.

The nozzle 31 is provided with a shouldered portion 32 which overlies a surface of the centrifugal rotor 13, and thus serves as a thrust bearing for the upper end of the rotor. The upper end of the rotor may be provided with a bearing sleeve 33 adapted to abut the shoulder 32 upon slight longitudinal movement of the rotor upwardly on the shaft 22. This arrangement helps to stabilize the rotor 13 in case the sleeve 23 rides upwardly on the shaft 22, as caused by upside-down flying of the aeroplane, for example. The nozzle 31 projects downwardly into the upper end of the rotor 13, and the lower end of this feed nozzle is shaped to form a turbine nozzle for driving a turbine wheel mounted within the centrifugal rotor, as will be explained in greater detail hereinafter.

The arrangement of the centrifugal casing, bearings, oil guard, centrifugal cover plate, conduits and rotor, as described above, involves a very convenient assemblage. When the parts are to be assembled, the sleeve 23 of the rotor 13, with the parts of the rotor proper assembled thereon, may first be placed over the upper end of the shaft 22. The oil guard 24 may then be arranged in place with the spring-pressed detents 25 engaging indents formed in the outer wall of the guard. The cover plate 28, with associated conduit 29 and nozzle 31, may then be arranged in place and secured to the wall of the casing 12, with the nozzle 31 projecting into the open upper end of the centrifugal rotor. When the parts are to be disassembled, this may be accomplished by removing the respective parts from the machine in the reverse order to that described above. After the nuts 35 by which the cover plate 28 is secured in position have been removed, this cover plate and associated conduits may be lifted away from the casing 12 and the centrifugal rotor. The guard 24 may then be removed by manipulation of the handle 36, and the rotor may then be lifted from the shaft 22. After the cover plate 28 is removed from the casing 12 the conduit 29 and nozzle 31 may be separated from the cover plate and from each other by removal of the nuts 37 and unscrewing of the screw threaded connection 38 between the conduit 29 and nozzle 31. All of the parts may thus be conveniently taken apart for cleaning.

Let us now consider the construction of the centrifugal rotor 13 and the turbine for driving that rotor. The centrifugal rotor consists of a main body section 39 and a top section 40 which may be secured together by a screw threaded engagement, as illustrated. The central portion of the main body section 39 constitutes the central sleeve 23 of the rotor which fits over the upper end of the shaft 22, as discussed above. A central feed tube 41 surrounds the sleeve 23 and is secured for rotation with the main body 39 of the rotor. This feed tube is provided with inwardly extending accelerator wings 55 and has a flange 42 dependent from its lower end. The flange 42 is spaced from the base 43 of the rotor, and serves to guide liquid entering the feed tube 41 downwardly and outwardly into a zone which is far beneath the level of liquid within the rotor 13 during normal operation of the machine. All liquid which enters the feed tube 41 must pass around the outer circumference 44 of the flange 42 before entering the principal separating space of the rotor.

Closely spaced, nested, frusto-conical discs 45 (of which only a few are shown) occupy the entire space between the upper wall 40 of the centrifugal rotor and the flange 42, and these discs constitute a plurality of very shallow superposed stratifying chambers in which impurities are adapted to be separated from the oil and caused to pass to the inner circumference of the wall 39 of the centrifugal rotor, under the influence of centrifugal force. The upper part of the feed tube 41 of the rotor constitutes, in effect, a turbine wheel. The outer part of this turbine wheel consists of a casing 46 which surrounds the lower end of the feed nozzle 31 as illustrated. This casing is formed in two substantially vertically extending portions separated by a frusto-conically extending step. The lower vertical portion of the casing 46 is secured snugly within the upper end of the main body of the feed tube 41, and the upper vertically extending portion of this casing surrounds the nozzle 31, and lies in close proximity thereto. Circumferentially spaced, radially extending, vanes or blades 47 are secured within the lower end of the casing 46, and these blades, together with the main body of the casing, constitute the turbine wheel to which the centrifugal rotor is secured for driving the rotor.

The lower end of the nozzle 31 is shaped to cause liquid passed into this nozzle in an axial direction from conduit 29 to be diverted to movement in a tangential direction from the circumferential wall of the lower portion of the nozzle. This is accomplished by providing steps 48 in the lower end of the nozzle 31, defining the upper ends of circumferentially extending turbine nozzles 49. The space beneath the steps 48 is cut away to provide a plurality (two, as illustrated) of circumferentially extending and tangentially discharging passages leading from inlets 50 to discharge ports 51. The lowermost end of the nozzle 31 is blocked by a plate 52 which defines the lowermost ends of the turbine nozzle passages 49, and changes the movement of all of the liquid passed vertically into the nozzle 31 to a horizontal direction. This liquid is thus discharged against the turbine blades 47, and causes rotation of these blades and the entire centrifugal rotor.

Wings 53 are formed on the outer circumference of the feed tube 41, and these wings maintain the body of liquid adjacent the outer circumference of the feed tube 41 in rotation at the same rate as the rotor itself, thereby preventing turbulence. Liquid entering the feed tube 41 of the centrifugal rotor through the turbine nozzle channels 49 impinges against the turbine wheel blades 47 and imparts rotational movement to the rotor. The blades 47 in turn maintain liquid which has entered the rotor in this space at approximately the same rotational velocity as the rotor. The liquid then passes downwardly through the space between the feed tube 41 and the outer surface of the sleeve 23, and through the space between the flange 42 and the base 43 of the centrifugal rotor. This liquid then passes around the outer circumference 44 of the flange 42 and enters the spaces between successive discs 45 in a plurality of separate parallel streams.

The principal removal of impurities from the oil occurs during passage of the oil inwardly from the space surrounding the discs 45 through the spaces between successive discs, and into the space lying within the discs. After purification of the oil, it is discharged from the centrifugal rotor through discharge outlets 54. These discharge outlets are designed to produce an additional impelling effect on the centrifugal rotor.

As illustrated in Figure 3 of the drawing, these passages extend, from their inlets which receive liquid from the main body of the rotor, to their outlets, in an upward direction and a direction which is opposed to the direction of rotation of the rotor. The outlets of the passages 54 are on substantially the same circumferences, relative to the rotor axis, as the inlets to these passages, and the discharge of liquid from the passages therefore has a very substantial impelling effect upon the rotor, assisting in the drive of the rotor, or at least effecting substantial recovery of energy which would otherwise be lost incident to discharge of liquid from the rotor.

The operation of the machine in the purification of oil discharged from the crank case of an aeroplane engine will now be apparent. This oil is discharged from the scavenging pump 10 through conduit 11 into centrifugal casing 12 under substantial pressure, and is passed through conduit 29 into nozzle 31. The turbine nozzles 49 in the base of the feed nozzle 31 convert the pressure energy imparted to the oil by the scavenging pump 10 into kinetic energy for driving the centrifugal rotor 13, with a high degree of efficiency. As pointed out above, the turbine nozzles 49 change the axial movement of the oil to a tangential movement at right angles to the axis of the feed nozzle 31, thereby causing the oil to impinge against the blades 47 of the turbine wheel 46—47 at a high velocity. Since the bearings of the rotor shaft are mounted on the opposite end of the rotor to the end through which liquid is fed, the liquid may be fed right along the axis of the rotor, and the radius at which this liquid strikes the turbine blades 47 is accordingly very small. Since the linear velocity of the oil as this oil strikes the turbine blades is high and the radial distance from the axis of the rotor to the points of impact of the oil against the turbine blades is small, the oil imparts a high rotational velocity to the rotor. Oil which enters the feed tube 41, after imparting rotational energy to the blades 47 and the rotor, descends through feed tube 41, and passes outwardly around the outer circumference of the flange 44.

In order to obtain a maximum purifying effect, it is necessary not only that the centrifugal rotor be rotated at a high velocity, but also that a deep body of oil be maintained in the rotor. The reason for this requirement is that the efficiency of the rotor will depend not merely on imparting a high centrifugal force to oil under treatment, but also on maintaining the oil under centrifugal force for a sufficient period of time to remove all of the larger abrasive particles from suspension in the oil. This is achieved by providing the discharge outlets 54 on a very small radius of the rotor, thereby maintaining a deep body of liquid in the rotor. Since the time interval during which any particle of oil is maintained under the influence of centrifugal force may be calculated by dividing the total quantity of oil in the rotor at any one time by the rate of passage of oil through the rotor, it will be evident that the time of centrifugal treatment of the oil varies directly as the volume of oil maintained in the rotor. The arrangement of the discharge outlets 54 on a small rotor radius thus affords the important advantage that it results in maintenance of the oil under centrifugal force for the longest possible time.

The arrangement of these outlets on a small radius also has the advantage that the oil discharged from such a radius has a relatively low linear velocity, and that the energy loss incident to discharge of the oil from the rotor is thus minimized. This small energy loss is still further reduced by designing the outlets 54 with a curvature opposed to the direction of rotor rotation, as discussed above.

A portion of the oil discharged from the outlets 54 forms a fine mist within the casing 12. This oil is prevented from contacting the outer circumference of the rotor 13 by reason of the arrangement of the annular guard 24 between the interior wall of the casing 12 and the outer wall of the rotor. It will be noted that the apparatus surrounding the centrifugal rotor affords an open framework through which the oil mist within the casing 12 has access to the bearings 20 and 21, and the lubrication of these bearings is accomplished by this mist. Oil discharged from outlets 54 passes downwardly around guard 24, through the opening 14 in the base of the casing 12, and into the oil tank 15, in which it is stored until required again for lubrication of the motor, or other aeroplane parts.

It is possible, by the use of the apparatus of the invention, to effect a high degree of purification of the oil, regardless of variations in the particular scavenging pump in a particular oil purifying system, and regardless of variations in the type of oil under treatment for use in a particular engine. This is made possible by reason of the fact that the nozzle 31 may be easily detached and replaced by a nozzle having finer turbine nozzle outlets 49, or larger turbine nozzle outlets, if desired. In testing the apparatus for use under conditions not previously encountered, the operator may equip the centrifugal with a nozzle 31 of particular characteristics. He may run a sample of the oil to be treated through the scavenging pump and this nozzle to the centrifugal, and then test a sample of oil discharged from the centrifugal. If he finds, as the result of this test work, that the centrifugal has failed to remove all particles of 0.0006" or greater diameter, he may then replace the nozzle 31 with a nozzle capable of driving the centrifugal rotor at a higher speed, and thus affording the additional centrifugal force required to remove all particles above the specified size.

The requirements of purification of oil discharged from an aeroplane crank case are difficult to fulfill, because of the fact that the rate at which purification must be accomplished depends on the rate at which the motor is running at any particular time. By connecting the nozzles of the impulse turbine mounted within the centrifugal rotor directly to the scavenging pump, and by feeding the oil from the scavenging pump directly into the rotor along the axis of the rotor and discharging it tangentially against radially extending turbine blodes, however, it is possible to effect the desired purification of the oil, regardless of the rate of operation of the motor.

Modifications will be obvious to those skilled in the art, and I do not therefore wish to be limited except by the scope of the sub-joined claims.

I claim:

1. In a centrifugal separator, the combination comprising a centrifugal rotor, means for feeding liquid to said rotor, and means for receiving liquid discharged from said rotor, said rotor being provided with discharge passages for causing liquid discharged from said rotor to flow, immediately prior to said discharge, in a direction relative to movement of said rotor which is opposite to the direction of rotor rotation, and the outlet ends of said discharge passages being approximately the same distance from the rotor axis as the inlet ends of said passages.

2. In a centrifugal separator, the combination comprising a centrifugal rotor, means for feeding liquid to said rotor, and means for receiving liquid discharged from said rotor, said rotor being provided with discharge passages for causing liquid discharged from said rotor to flow, immediately prior to said discharge, in a direction relative to movement of said rotor which is opposite to the direction of rotor rotation, and the outlet ends of said discharge passages being at least at close to the rotor axis as the inlet ends of said passages.

3. In a centrifugal separator, the combination comprising a casing secured above a reservoir for liquid discharged from the centrifugal separator, a centrifugal rotor mounted within said casing, an open framework extending inwardly from said casing, a bearing housing secured to the inner portion of said open framework, longitudinally spaced bearings within said housing and in communication with the atmosphere of said casing, a rotor shaft secured for rotation within said bearings and secured to said centrifugal rotor for rotation therewith, a turbine wheel secured to said centrifugal rotor, and a conduit extending axially of said rotor through said casing for conveying a lubricant liquid to said turbine wheel, and into said centrifugal rotor, whereby to drive said turbine and rotor, and effect purification of liquid fed through said conduit into said centrifugal rotor.

4. In a centrifugal separator, the combination comprising a shaft, a centrifugal rotor detachably secured to said shaft for rotation therewith but longitudinally movable with respect thereto, a conduit having an end projecting into the end of said rotor opposite to the end of said rotor to which said shaft is secured, and a thrust bearing on said conduit for the end of said rotor opposite to the end of said rotor to which said shaft is secured, said thrust bearing being normally spaced above the rotor surface with which it coacts.

5. In a centrifugal separator, the combination comprising a shaft, a centrifugal rotor detachably secured to said shaft for rotation therewith but longitudinally movable with respect thereto, a conduit having an end projecting into the end of said rotor opposite to the end of said rotor to which said shaft is secured, and a shouldered surface on the exterior of said conduit forming a thrust bearing opposed to a surface of rotation on the end of said rotor opposite to the end of said rotor to which said shaft is secured, said thrust bearing being normally spaced above the rotor surface with which it coacts.

6. In a centrifugal separator, the combination comprising, a centrifugal rotor, a shaft secured to one end of said rotor, a pair of longitudinally spaced bearings beyond the end of said rotor to which said shaft is secured, said bearings supporting said shaft for rotational movement, a turbine wheel within said rotor, a conduit extending coaxially with said rotor through an opening in the end of said rotor opposite to the end thereof to which said shaft is secured, and a nozzle on the axially positioned end of said conduit within said rotor for injecting liquid fed through said conduit into said rotor in an impelling direction against said turbine wheel at a portion of said wheel closely surrounding said nozzle.

7. In a centrifugal separator, the combination comprising, a centrifugal rotor, a shaft secured to one end of said rotor, a pair of longitudinally spaced bearings beyond the end of said rotor to which said shaft is secured, said bearings supporting said shaft for rotational movement, a turbine wheel within said rotor, a conduit extending coaxially with said rotor through an opening in the end of said rotor opposite to the end thereof to which said shaft is secured, and a nozzle on the axially positioned end of said conduit within said rotor for injecting liquid fed through said conduit into said rotor in an impelling directon against said turbine wheel at a portion of said wheel closely surrounding said nozzle, said nozzle being mounted in position within said turbine wheel.

8. In a centrifugal separator, the combination comprising, a casing, a centrifugal rotor mounted within said casing, an open framework extending inwardly from said casing to a portion of said casing below the rotor, a bearing housing secured to the inner portion of said open framework, bearings within said housing in communication with the atmosphere of said casing, a rotor shaft secured for rotation within said bearings and secured to said centrifugal rotor for rotation therewith, a conduit for feeding a lubricant liquid into and through said rotor for treatment therein, and means controlling discharge of said lubricant liquid from said rotor into said casing, whereby to effect purification of said liquid in said rotor and lubrication of said bearings by lubricant discharged into the atmosphere of said casing.

9. In a centrifugal separator, the combination comprising, a centrifugal rotor, a turbine wheel secured within said centrifugal rotor for rotation therewith, a conduit mounted coaxially with said rotor for feeding liquid under pressure longitudinally toward said rotor along said axis, and means formed in an axially positioned portion of said conduit for deflecting liquid passed through said conduit and causing said liquid to be projected in an impelling direction against said turbine wheel in a zone closely surrounding said axially mounted conduit, said last-mentioned means being mounted within said turbine wheel.

10. In a centrifugal separator, the combination comprising, a centrifugal rotor, a turbine wheel secured within said centrifugal rotor for rotation therewith, a conduit mounted coaxially with said rotor for feeding liquid in a longitudinal direction along the axis of said rotor toward said rotor, and means formed in an axially positioned portion of said conduit for deflecting liquid passed through said conduit in an axial direction, and converting the axial movement of said liquid to a longitudinal movement relative to said conduit in a plurality of streams, and discharging said liquid from said conduit against said turbine wheel in a zone closely surrounding said axially mounted conduit, said last-mentioned means being mounted within said turbine wheel.

11. In a centrifugal separator, the combination comprising, a centrifugal rotor, a turbine wheel secured to said rotor coaxially of said rotor, a conduit for actuating liquid mounted coaxially with said rotor and extending in a direction along said axis to a point within said turbine wheel, means for forcing liquid under pressure through said conduit, and means formed in an axially positioned portion of said conduit for converting axial movement of said liquid through said conduit into tangential movement of said liquid against said turbine wheel in a zone closely surrounding said axially mounted conduit, said last-mentioned means being mounted within said turbine wheel.

12. In a centrifugal separator, the combination comprising a centrifugal rotor, a turbine wheel coaxial with said rotor and secured thereto, a conduit for impelling liquid extending into the space within said turbine wheel and mounted upon the axis of said turbine wheel, an end plate on said conduit, and a passage communicating with the interior of said conduit and extending in a direction which is substantially at right angles to the axis of said turbine wheel, said passage terminating in a portion which extends substantially tangentially with respect to said conduit at a portion of said conduit closely surrounded by said turbine wheel, whereby to discharge liquid from said conduit against said turbine wheel in a direction which is substantially at right angles with respect to said turbine wheel axis.

13. In a centrifugal separator, the combination comprising, a centrifugal rotor, a turbine wheel coaxial with said rotor and secured thereto, a conduit mounted upon the axis of said rotor for impelling liquid into the space within said turbine wheel in a direction along the axis of said turbine wheel, an end plate on said conduit, and a plurality of passages communicating with the interior of said conduit and extending in directions which are substantially at right angles to the axis of said turbine wheel, said passages terminating in portions which extend substantially tangentially with respect to said conduit and are in close proximity to the surrounding turbine wheel, whereby to discharge liquid from said conduit against said turbine wheel in a plurality of directions which are substantially at right angles with respect to said turbine wheel axis.

14. In a centrifugal separator, the combination comprising a shaft, a centrifugal rotor detachably secured at its lower end to said shaft for rotation therewith but longitudinally movable with respect thereto, a conduit having an end projecting into the upper end of said rotor, a bearing for said shaft below said rotor, and a thrust bearing mounted above a surface of the upper portion of said rotor, said thrust bearing being normally spaced above the rotor surface with which it coacts.

LEO D. JONES.